US010830644B2

(12) United States Patent
Craighead et al.

(10) Patent No.: US 10,830,644 B2
(45) Date of Patent: Nov. 10, 2020

(54) METHOD FOR DETERMINATION OF A MATCHING COLOUR VARIANT

(75) Inventors: Alan Craighead, Norcross, GA (US); Claude Griffith, Norcross, GA (US); Swie Lan Njo, Oegstgeest (NL)

(73) Assignee: Akzo Nobel Coatings International B.V., Arnhem (NL)

(*) Notice: Subject to any disclaimer, the term of this patent is extended or adjusted under 35 U.S.C. 154(b) by 2079 days.

(21) Appl. No.: 12/994,307

(22) PCT Filed: May 26, 2009

(86) PCT No.: PCT/EP2009/056373
§ 371 (c)(1),
(2), (4) Date: Nov. 23, 2010

(87) PCT Pub. No.: WO2009/144222
PCT Pub. Date: Dec. 3, 2009

(65) Prior Publication Data
US 2011/0085169 A1   Apr. 14, 2011

Related U.S. Application Data

(60) Provisional application No. 61/056,723, filed on May 28, 2008.

(30) Foreign Application Priority Data

Jun. 13, 2008   (EP) ..................... 08158239

(51) Int. Cl.
*G01J 3/46* (2006.01)
*G01J 3/50* (2006.01)

(52) U.S. Cl.
CPC ................ *G01J 3/46* (2013.01); *G01J 3/504* (2013.01); *G01J 3/463* (2013.01); *G01J 3/465* (2013.01)

(58) Field of Classification Search
CPC .. G01J 3/463; G01J 3/465; G01J 3/504; G01J 3/46
USPC ................................. 356/402–425
See application file for complete search history.

(56) References Cited

U.S. PATENT DOCUMENTS

| | | | | |
|---|---|---|---|---|
| 3,916,168 A * | 10/1975 | McCarty | ................ | G01J 3/501 356/405 |
| 4,615,902 A * | 10/1986 | Falcoff | ................. | B07C 5/3412 118/665 |
| 5,929,998 A * | 7/1999 | Kettler et al. | ................ | 356/405 |
| 6,204,923 B1 | 3/2001 | Willing | | |
| 6,330,342 B1 * | 12/2001 | Winter | ...................... | G01J 3/46 356/402 |
| 6,522,977 B2 | 2/2003 | Corrigan et al. | | |
| 6,539,325 B1 | 3/2003 | Numata et al. | | |
| 6,563,510 B1 * | 5/2003 | Rice et al. | ..................... | 345/593 |
| 6,717,673 B1 * | 4/2004 | Janssen | ..................... | G01J 3/46 356/402 |
| 6,768,814 B1 * | 7/2004 | Spitzer et al. | ................ | 382/162 |
| 7,132,644 B2 * | 11/2006 | Grunert et al. | ............... | 250/226 |
| 7,301,627 B2 * | 11/2007 | Overbeck et al. | ............ | 356/319 |
| 7,433,064 B2 * | 10/2008 | Takahashi | ..................... | 358/1.13 |
| 8,031,938 B2 * | 10/2011 | Edge | ............................. | 382/167 |
| 2001/0036309 A1 * | 11/2001 | Hirayama | ................. | G06T 7/90 382/167 |
| 2004/0179101 A1 * | 9/2004 | Bodnar | ..................... | G01J 3/02 348/188 |
| 2004/0239928 A1 * | 12/2004 | Masuda | .................... | G01J 3/46 356/326 |
| 2007/0003691 A1 * | 1/2007 | Rodrigues et al. | ........... | 427/140 |
| 2007/0250273 A1 | 10/2007 | De Haas et al. | | |
| 2008/0312370 A1 * | 12/2008 | Guiu et al. | ..................... | 524/493 |
| 2009/0157212 A1 * | 6/2009 | McClanahan | ............ | G01J 3/46 700/107 |

FOREIGN PATENT DOCUMENTS

| | | | | |
|---|---|---|---|---|
| GB | 2058387 A * | 4/1981 | ............... | G01J 3/48 |
| WO | 2006/121776 | 11/2006 | | |

* cited by examiner

*Primary Examiner* — Maurice C Smith
(74) *Attorney, Agent, or Firm* — McDonnell Boehnen Hulbert & Berghoff LLP

(57) ABSTRACT

The invention relates to a method of determination of a matching variant of a standard colour of a repair paint matching the effect colour of an object to be repaired, the method comprising the steps of a) determination of the standard colour of the colour of the object to be repaired, and b) determination of the best matching variant of the standard colour from a given number of variant colours, wherein • a swatch coated with the colour of the standard colour is visually compared under at least two different angles of illumination and/or observation with the colour to be matched, • the visual deviation from the standard colour and the colour of the object to be matched being evaluated on the basis of predetermined deviations for the visual properties, wherein the predetermined visual properties comprise at least one colour property and at least one texture property, • based on the predetermined deviations for the visual properties of the standard colour and the colour of the object to be matched, the best matching variant of the standard colour is determined.

17 Claims, No Drawings

METHOD FOR DETERMINATION OF A MATCHING COLOUR VARIANT

REFERENCE TO RELATED APPLICATION(S)

This application is the U.S. National Phase of PCT/EP2009/056373 filed on May 26, 2009 and claims the benefit of U.S. Provisional Application No. 61/056,723 filed on May 28, 2008.

The invention relates to a method of determination of a matching variant of a standard colour of a repair paint matching the colour of an object to be repaired. Colour variants are variants of the same standard colour of coated substrates, such as automobiles, which occur due to small variations in the process conditions, for example at different manufacturing sites, or due to batch-to-batch variations of paints or the ingredients thereof. Although these differences may be unnoticeable on separate vehicles, when they are present on one body panel or on adjacent body panels, such as a hood and a fender, of the same vehicle, the differences can be visibly perceptible. These colour variations make it difficult to attain an excellent colour match in an automobile body repair shop. Typically, three to six variants are used to cover the range of variants of one standard colour occurring in the field. For colour matching during automobile repair it is not only required to select the correct standard colour, but also to select the best matching colour variant. It is to be understood that it is also possible that the standard colour gives the best match. Therefore, the standard colour is included in the number of colour variants from which the best match is selected.

International patent application WO 2006/1121776 A describes a number of methods which have been devised for the process of paint colour matching. A typical method uses a device, typically a spectrophotometer, and measures colour characteristics of the painted surface and matches the measurements to those archived in a computer database associated with previously developed paint formulas. In this method, the computer database is located at the repair facility. A paint formula having the colour characteristics closest to those of the painted surface of the vehicle being refinished or repainted is chosen and used to formulate a paint, which is then applied to a test panel and compared to the paint on the vehicle being refinished or repainted. Typically, this formulated paint does not adequately match the colour of the vehicle being refinished or repainted and must be manually adjusted until a colour match is obtained. This is a rather inefficient process and significantly affects the labour cost of a finishing procedure. Furthermore, spectrophotometers are expensive and easy to damage under the conditions prevailing in an automobile body repair shop. Spectrophotometers often require specifically skilled operators.

A related method is shown in U.S. Pat. No. 6,522,977, which uses the VIN (Vehicle Identification Number) containing a serial, number that can be associated with the colour used on the vehicle and provides that serial number to a central computer, which then provides a recommended paint formula that can be used to formulate a paint to refinish or repair the damaged paint on the vehicle.

A known method for colour variant selection is to provide the bodyshops with swatches of the standard colour and of each colour variant of the standard colour. The sprayer can select the best matching swatch by visual comparison of the automobile surface to be repaired and the swatches. Each swatch corresponds to a colour variant and an associated paint recipe. The paint recipe corresponding to the swatch having the lowest overall deviation for visual properties is selected as the best matching recipe. However, it is expensive to provide all automobile body shops with swatches of thousands of colour variants and to update the system regularly. Also, due to variations in the swatch preparation process, colour swatches sometimes differ in colour properties from the actual target colour sprayed by the user.

Another procedure currently used is that a paint supplier will provide swatches only for a refinish paint that matches the standard paint colour, and alternate descriptions of refinish paints available are provided. The refinisher places the swatch representing the standard paint colour and judges the difference from the paint on the vehicle that is to be matched, e.g., lighter and greener at near-specular angle and darker at the flop angle, and matches that information with the description of the alternate paint formulas available and chooses the closest alternate and then attempts to spray-match the colour of the vehicle being repaired. Such a technique may or may not provide an adequate match.

Therefore, there is a need for an alternative method for determination of a matching variant of a standard colour of a repair paint matching the colour of an object to be repaired. The method should not rely on swatches of all colour variants. The method should be suitable for use in an automobile body repair shop. It should not require expensive and/or sensitive equipment, such as spectrophotometers and computers. Above all, the method should lead to reliable colour matching of repair paints.

The invention now provides a method of determination of a matching variant of a standard colour of a repair paint matching the effect colour of an object to be repaired, the method comprising the steps of a) determination of the standard colour of the object to be repaired, and b) determination of the best matching variant of the standard colour from a given number of variant colours, wherein a swatch coated with the colour of the standard colour is visually compared under at least two different angles of illumination and/or observation with the colour to be matched, the visual deviation from the standard colour and the colour of the object to be matched being evaluated on the basis of predetermined deviations for the visual properties, wherein the predetermined visual properties comprise at least one colour property and at least one texture property, based on the predetermined deviations for the visual properties of the standard colour and the colour of the object to be matched, the best matching variant of the standard colour is determined.

The effect colour of the object to be matched generally is a metallic effect colour or a pearlescent effect colour. It is also possible that the colour will exhibit a combination of metallic and pearlescent effects. Metallic effects in paints are suitably achieved by metallic particles present in the paint, for example aluminium flakes. Particles of other shapes or other metals can be used as well. Other special effect pigments which can be used are pearlescent pigments.

As mentioned above, the predetermined visual properties comprise at least one colour property. Such colour properties include lightness, colour direction, saturation, and hue. The visual properties also include at least one texture property. By texture is meant the visible texture in the plane of the coating film. Examples of visual texture properties include coarseness and sparkle. Generally, the deviation for at least three visual properties is determined. The accuracy of the determination of the best matching variant can be improved when the deviation is determined for more visual properties, for example for four or five predetermined visual properties. However, the number of deviations for visual properties to be determined should not become too large, because otherwise the method will be overly time-consuming for the operator, which would make it less attractive for use in an automobile body repair shop. Therefore, generally the deviation for at most eight, or six, predetermined visual properties is determined.

The object to be repaired can be an automobile. However, the method is also suitable for other objects where the colour of the repair paint has to exactly match the original paint colour, for examples trucks, buses, trains, and airplanes.

The determination of the standard colour of the object to be repaired can be carried out according to known methods. In most cases, the standard colour of an automobile is known to the owner, or it is encoded or directly mentioned in the manufacturer's documentation of the automobile.

The number of variants associated with each standard colour may vary. Usually, each standard colour has at least two, or at least three, or at least four variants associated with it. Generally, the number of variants per standard colour does not exceed ten, eight, or six. As already mentioned above, it is possible that the best match is obtained with the standard colour. Therefore, the number of colour variants from which the best match is selected always includes the standard colour as well.

The best matching variant is suitably determined using a database wherein sets of deviations for predetermined visual properties are linked to a specific variant of a standard colour. In one embodiment, the database is implemented on an electronic data storage and processing unit, usually a computer system. However, it is also possible to have the database implemented in conventional form, for example in the form of paper files. For ease of use, the set of colour swatches may be accompanied by a notebook, in which an operator can document the deviations for predetermined visual properties.

Generally, it is also desirable to determine a recipe for preparing a paint of the best matching colour variant. This can be conveniently implemented in the above-mentioned database by linking a corresponding paint recipe to every colour. The paint recipe specifies the amounts and types of raw materials, and the process of preparing the paint.

In one embodiment, the method of the invention further includes preparing a paint of the best matching colour variant by following the determined recipe. In a further embodiment, the method includes using the paint prepared for refinishing an automobile or a large transportation vehicle.

In a still further embodiment, the predetermined visual property having the highest deviation is given a higher weight than the other predetermined visual properties in the determination process. This can be implemented by assigning the visual properties several, predetermined, levels of importance. It has been found that this leads to a further improvement of the accuracy of the selection of the best matching variant.

For ease of operation it is useful if the direction of the visual deviation for the predetermined visual properties is indicated by predetermined symbols, for example by "+" and "−". Alternatively, the deviation can also be indicated using standardized expressions, such as "blacker", "greener", "cleaner", "dirtier".

Additionally, it is also convenient to indicate the magnitude of the visually perceived deviation for the predetermined visual properties by predetermined symbols. Thus, the above-mentioned symbols for the direction of the deviation can be repeated, each additional repetition indicating an increasing deviation. Usually, the magnitude of the deviation will be indicated by selecting from a predetermined number of magnitude indicators, for example two or three, such as "+", "++", and "+++".

Suitably, the deviation for predetermined visual properties is determined under a source of illumination emitting light having a defined spectral distribution. In one embodiment, the spectral distribution of the light emitted is similar to or essentially the same as natural daylight. In another embodiment, the deviation for predetermined visual properties is determined under two different sources of illumination emitting light of different spectral distribution. Using two different light sources can reduce the risk of metameric failure of the selected variant. Examples of suitable sources of illumination are light emitting diodes, fluorescent lamps, and incandescent lamps. A suitable commercially available source of illumination is the Sun Gun Color Matching Light available from 3M.

The deviation for the visual properties is determined under at least two different viewing geometries. Typically, when the method is used for matching a repair paint for an automobile, a swatch coated with a paint in the colour of the standard colour of the automobile is placed essentially parallel to an undamaged body panel of the automobile. The swatch may, for example, be placed on the hood or the bonnet of the automobile, or it may be attached to a body panel using an adhesive tape. The visual deviation for the predetermined visual properties of the standard colour swatch and the colour of the automobile to be matched is then determined at a first geometry. An example of a first geometry is an angle of illumination of 45° and an angle of observation of 25°, both angles being measured relative to the plane of the body panel. An example of a second geometry would be an angle of illumination of 65° and an angle of observation of 90°, both angles being measured relative to the plane of the body panel. It is also possible to determine the visual deviation for the predetermined visual properties at more than two geometries, for example at three or even four different geometries.

The invention claimed is:

1. A method of preparing a repair paint matching the effect color of an object to be repaired, the method comprising
   a) determining the standard color of the color of the object to be repaired, and
   b) determining the best matching variant of the standard color from a 3-6 variant colors, by a method comprising
      (i) visually comparing a swatch coated with the color of the standard color to the color to be matched under at least two different angles of illumination and/or observation,
      (ii) evaluating the visual deviation of the standard color from the color of the object to be matched on the basis of predetermined deviations in predetermined visual properties, wherein the predetermined visual properties comprise lightness, color direction and coarseness,
      (iii) determining the best matching variant of the standard color based on the evaluation in (ii) and a database of sets of the predetermined deviations for the predetermined visual properties of (ii) linked to specific variants of standard colors, wherein the predetermined visual property having the highest deviation is given a higher weight than the other predetermined visual properties in the determination process, and further comprising preparing a paint of the best matching color variant.

2. The method according to claim 1, wherein the color of the object to be matched is a metallic and/or pearlescent color.

3. The method according to claim 2, wherein the predetermined visual properties include lightness, color direction, and coarseness.

4. The method according to claim 1, wherein the best matching variant is determined from at least three variant colors.

5. The method according to claim 4, wherein the best matching variant is determined from at most six variant colors.

6. The method according to claim 1, wherein the best matching variant is determined from at most six variant colors.

7. The method according to claim 6, wherein the best matching variant is determined using a database wherein sets of deviations for predetermined visual properties are linked to specific variants of standard colors.

8. The method according to claim 7, wherein the database is implemented on an electronic data storage and processing unit.

9. The method according to claim 1, wherein the direction and the magnitude of the deviation for the predetermined visual properties are indicated by predetermined symbols.

10. The method according to claim 1, wherein the deviation for predetermined visual properties is determined under a source of illumination having a spectral distribution which is essentially the same as natural daylight.

11. The method according to claim 1, wherein the database is implemented on an electronic data storage and processing unit.

12. The method according to claim 1, further comprising the step of determination of a recipe for preparing a paint of the best matching color variant.

13. The method according to claim 12, wherein a paint of the best matching color variant is prepared by following the determined recipe.

14. The method according to claim 13, wherein the paint prepared is used for refinishing an automobile or a large transportation vehicle.

15. The method according to claim 1, wherein the best matching variant is determined from at least three variant colors.

16. The method according to claim 1, wherein the best matching variant is determined from at most six variant colors.

17. The method according to claim 1, wherein the deviation for predetermined visual properties is determined under a source of illumination having a spectral distribution which is essentially the same as natural daylight.

* * * * *